United States Patent
Liu et al.

(10) Patent No.: US 10,292,201 B2
(45) Date of Patent: May 14, 2019

(54) USER EQUIPMENT FOR DISCONTINUOUS RECEPTION AND METHOD PERFORMED BY A USER EQUIPMENT

(71) Applicant: Intel IP Corporation, Santa Clara, CA (US)

(72) Inventors: Chunhui Liu, Dresden (DE); Jose A. Cesares Cano, Dresden (DE); Piotr Janik, Fuerth (DE)

(73) Assignee: Intel IP Corporation, Santa Claara, CA (US)

( * ) Notice: Subject to any disclaimer, the term of this patent is extended or adjusted under 35 U.S.C. 154(b) by 189 days.

(21) Appl. No.: 15/352,829

(22) Filed: Nov. 16, 2016

(65) Prior Publication Data

US 2017/0181218 A1 Jun. 22, 2017

(30) Foreign Application Priority Data

Dec. 16, 2015 (DE) .................. 10 2015 121 948

(51) Int. Cl.
*H04W 76/28* (2018.01)
*H04W 76/27* (2018.01)
*H04W 68/00* (2009.01)
*H04W 72/04* (2009.01)

(52) U.S. Cl.
CPC ......... *H04W 76/28* (2018.02); *H04W 68/005* (2013.01); *H04W 72/042* (2013.01); *H04W 76/27* (2018.02)

(58) Field of Classification Search
None
See application file for complete search history.

(56) References Cited

U.S. PATENT DOCUMENTS

| 2009/0310503 A1* | 12/2009 | Tenny | H04W 68/00 370/252 |
| 2011/0267955 A1* | 11/2011 | Dalsgaard | H04W 24/00 370/241 |
| 2012/0218889 A1* | 8/2012 | Watfa | H04W 60/04 370/230 |
| 2012/0315929 A1* | 12/2012 | Oshinsky | H04W 88/02 455/458 |
| 2013/0201892 A1* | 8/2013 | Holma | H04W 76/28 370/311 |

(Continued)

FOREIGN PATENT DOCUMENTS

EP 2696629 A1 2/2014

*Primary Examiner* — Phirin Sam
*Assistant Examiner* — Faiyazkhan Ghafoerkhan
(74) *Attorney, Agent, or Firm* — Schiff Hardin LLP

(57) ABSTRACT

A user equipment for discontinuous reception operation in a wireless communication network comprises a receiver. The receiver is configured to operate in an RRC-connected state with predefined DRX active state time periods. The user equipment comprises a paging monitor which is configured to check whether a general paging message has already been read in a current paging cycle. The paging monitor is configured to check whether a general paging message is to be received in a current DRX active state time period if no general paging message has been read in the current paging cycle. The paging monitor is configured to read the general paging message during the current DRX active state time period.

24 Claims, 10 Drawing Sheets

(56) References Cited

U.S. PATENT DOCUMENTS

| | | | |
|---|---|---|---|
| 2013/0229965 A1* | 9/2013 | Bressanelli | H04W 52/0216 370/311 |
| 2014/0120959 A1* | 5/2014 | Kang | H04W 52/0245 455/458 |
| 2014/0148150 A1* | 5/2014 | Clevorn | H04W 68/005 455/423 |
| 2014/0177595 A1* | 6/2014 | Di Girolamo | H04W 76/18 370/331 |
| 2015/0085730 A1* | 3/2015 | Sun | H04W 52/0235 370/311 |
| 2015/0215771 A1* | 7/2015 | Ranke | H04W 8/12 455/433 |
| 2015/0237577 A1* | 8/2015 | Zhang | H04W 4/70 370/311 |
| 2015/0365900 A1* | 12/2015 | Kanamarlapudi | H04W 52/0241 370/311 |
| 2015/0373771 A1* | 12/2015 | Keller | H04W 76/18 370/338 |
| 2016/0044578 A1* | 2/2016 | Vajapeyam | H04W 52/0216 370/252 |
| 2016/0219553 A1* | 7/2016 | Sundberg | H04L 1/0009 |
| 2016/0262130 A1* | 9/2016 | Johansson | H04L 41/0672 |
| 2016/0286385 A1* | 9/2016 | Ryu | H04W 76/28 |
| 2016/0295504 A1* | 10/2016 | Wang | H04W 52/02 |
| 2016/0316451 A1* | 10/2016 | Hsu | H04W 4/08 |
| 2016/0345301 A1* | 11/2016 | Webb | H04W 72/042 |
| 2017/0048842 A1* | 2/2017 | Han | H04W 52/0216 |
| 2018/0098297 A1* | 4/2018 | Yu | H04W 56/00 |

* cited by examiner

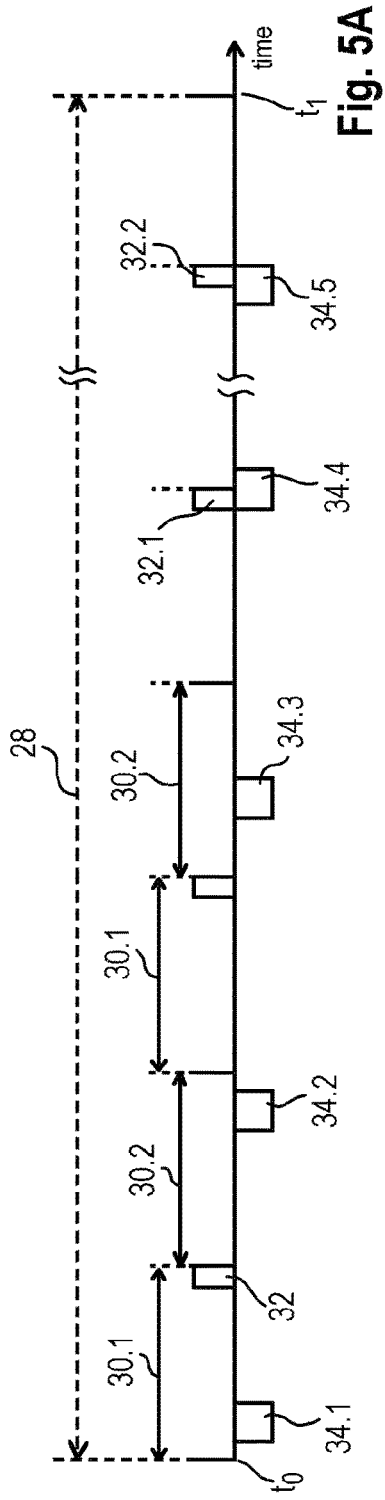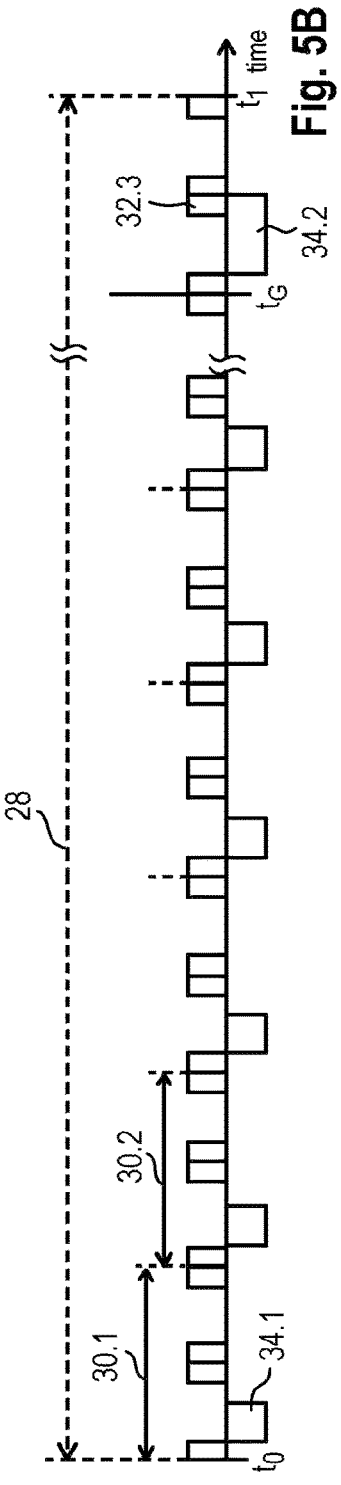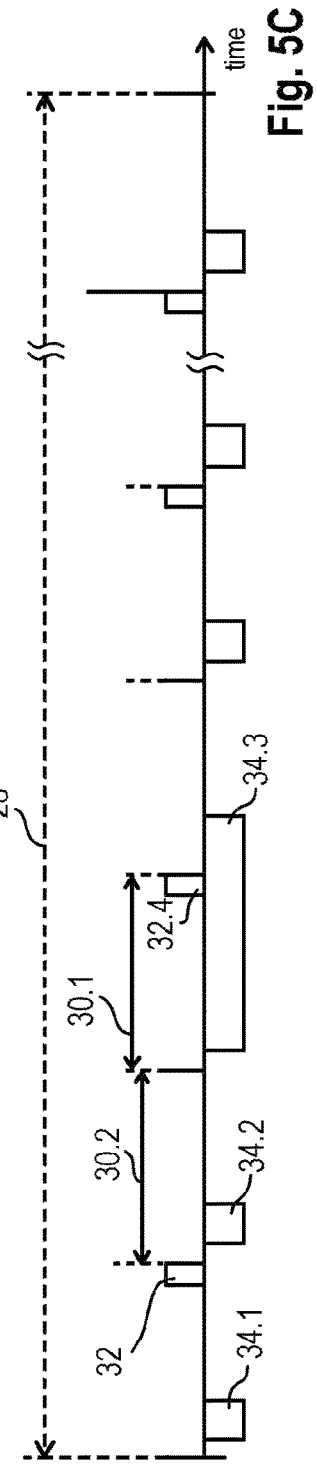

USER EQUIPMENT FOR DISCONTINUOUS RECEPTION AND METHOD PERFORMED BY A USER EQUIPMENT

FIELD

Embodiments described herein generally relate to user equipments for discontinuous reception operation in a wireless communication network. More specifically, embodiments described herein relate to user equipments comprising a paging monitor. Further embodiments described herein relate to a methods performed by a user equipment for discontinuous reception operation.

BACKGROUND

Wireless communication networks or radio communication networks may require a communication between a base station (BS) which may be a fixed station and a user equipment (UE) which may be a mobile station.

In a discontinuous reception (DRX) operation in a wireless communication network, the UE may be allowed to monitor discontinuously whether the BS transmits any information concerning the UE. DRX may improve the battery lifetime of a UE.

A radio resource control (RRC) protocol may be used by the wireless communication network and provide for connection establishment and release functions between the UE and the BS. A UE may be either in an idle mode or so-called RRC_IDLE state or in a connected mode or so-called RRC_CONNECTED state.

In the RRC_IDLE state, the UE may be configured to monitor a paging reception. Paging occasions (PO) may depend on a paging cycle. In the RRC_CONNECTED state, the UE may be assigned a DRX time cycle to receive scheduled information. The DRX time cycle may comprise DRX active time periods and DRX inactive time periods. During the DRX active time or DRX active state the UE may receive a physical downlink control channel (PDCCH). In the DRX inactive period the UE may not be required to monitor the PDCCH. The DRX inactive period may provide a sleep opportunity for the UE which allows saving battery life.

Regardless its DRX configuration, for example regardless its DRX time cycle, a UE in RRC_CONNECTED state may be still required to monitor paging reception. Paging reception monitoring may be required to detect and to apply system information (SI) modifications as well as notifications for earthquake and tsunami warning system (ETWS). Further information which may be required to be detected in paging messages is the commercial mobile alert system (CMAS).

The time periods of DRX active states may depend on the DRX cycle. Paging occasions may depend on the paging cycle. DRX cycle and paging cycle may not be adapted to each other. When a DRX active state and a paging reception opportunity or paging occasion are not aligned in time, a time where UE may be in a sleep modus, may be shortened and hence battery lifetime may be shortened as well. For this and other reasons there is a need for the present disclosure.

BRIEF DESCRIPTION OF THE DRAWINGS

The accompanying drawings are included to provide a further understanding of exemplary user equipments and methods performed by user equipments and are incorporated in and constitute a part of the specification. The drawings illustrate exemplary embodiments and together with the description serve to explain principles. Other embodiments and many of the intended advantages of embodiments will be readily appreciated as they become better understood by reference to the following detailed description.

FIGS. 5A-5C schematically illustrate time diagrams of general paging occasions and DRX active states in different configurations.

DETAILED DESCRIPTION

Figure 1:
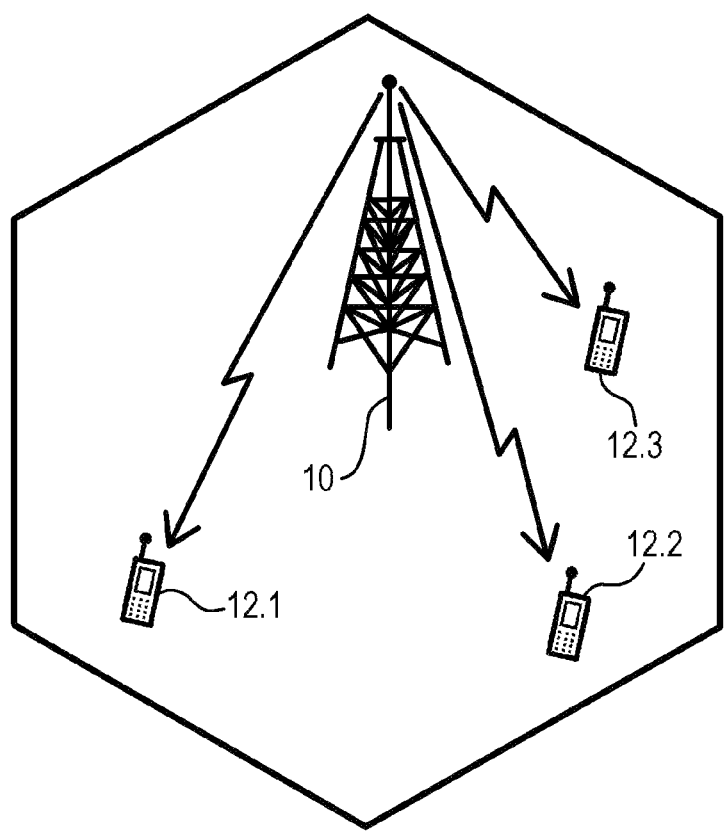
FIG. 1 schematically illustrates a wireless communication network.

In the following, embodiments are described with reference to the drawings wherein like reference numerals are generally utilized to refer to like elements throughout. In the following description, for purposes of explanation, numerous specific details are set forth in order to provide a thorough understanding of one or more aspects. However, it may be evident to a person skilled in the art that one or more aspects may be practiced with a lesser degree of these specific details. The following description is therefore not to be taken in a limiting sense and the scope of protection is defined by the appended claims.

The various aspects summarized may be embodied in various forms. The following description shows by way of illustration various combinations and configurations in which the aspects may be practiced. It is understood that the described aspects and/or embodiments are merely examples and that other aspects and/or embodiments may be utilized and structural and functional modifications may be made without departing from the scope of the present disclosure. In addition, while a particular feature or aspect of an embodiment may be disclosed with respect to only one of several implementations, such feature or aspect may be combined with one or more other features or aspects of the other implementations as it may be desired and advantageous for any given or particular application.

Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal. As employed in this specification, the terms "coupled" or "connected" are not meant to mean that elements must be directly coupled or connected together. Intervening elements may be provided between the "coupled" or "connected" elements.

FIG. 1 schematically illustrates an exemplary cell of a wireless communication network with a BS 10 and three UEs 12.1, 12.2 and 12.3.

The wireless communication network may e.g. use Code Division Multiple Access (CDMA), Time Division Multiple Access (TDMA), Frequency Division Multiple Access (FDMA), Orthogonal FDMA (OFDMA) and others. The terms "network", "system" and "radio communications system" may be used synonymously. A CDMA network may implement a radio technology such as Universal Terrestrial Radio Access (UTRA), CDMA 2000, etc. UTRA includes wideband-CDMA (W-CDMA) and other CDMA variants. CDMA 2000 covers IS-2000, IS-95 and IS-856 standards. A TDMA network may implement a radio technology such as global system for mobile communications (GSM) and derivatives thereof. The network may be part of Universal Mobile Telecommunication System (UMTS). The wireless communication network may function according to an LTE standard. In the following, the description is based on an LTE network which is not to be understood to limit the embodiments to a use in an LTE network.

Transmission in the communication network may be performed in so-called radio frames and subframes. In LTE, one radio frame may comprise ten subframes, one subframe having a length of one millisecond, one radio frame having a length of 10 milliseconds.

The BS 10 may also be referred to as access point, NodeB or evolved NodeB (eNB). The BS 10 may send on downlink channels data to the three UEs 12.1, 12.2 and 12.3. The BS 10, or more generally the network, may configure for each UE a specific DRX cycle. The BS 10, or more generally the network, may configure a paging cycle common to all UEs. Each UE may select a paging occasion (PO) out of the paging occasions comprised in the paging cycle, which may be called a UE specific paging occasion.

The UEs 12.1, 12.2 and 12.3 may also be referred to as access terminals, wireless communication devices or user terminals (UT). The UEs may e.g. be one out of a mobile phone, a smart phone, a tablet and so on. The UEs may be configured to use a DRX operation in idle mode and in active mode. In an LTE network the idle mode may be referred to as RRC_IDLE state and the active mode may be referred to as RRC_CONNECTED state. The UEs 12.1, 12.2 and 12.3 may send on uplink channels data to the BS 10.

In the RRC_IDLE state, a UE may be configured to monitor for paging reception. Paging reception may include receiving paging messages. Paging reception is possible during paging occasions (PO) which are time periods designated for transmission of paging messages. During the POs the BS sends the paging messages. A paging message may comprise a UE-specific paging message or in other terms a UE-specific information and a general paging message or in other terms a general information to all UEs. It is to be understood that during one PO both parts of the paging messages, the UE-specific paging message and the general paging message may be sent. The POs follow each other according to a paging cycle set by the network. The UE-specific paging messages may comprise for example a connection request, or in other words a request to change to the RRC_CONNECTED state. The general paging messages may comprise alert messages, for example SI modifications, ETWS and/or CMAS. The same general paging message may be sent to all UEs 12.1, 12.2 and 12.3 in a cell.

According to the LTE standard, in the RRC_IDLE state a UE is obliged to monitor one paging occasion per paging cycle, more specifically its UE-specific paging message. There may be more than one PO in one paging cycle in a cell depending on network configuration. All of these POs may transmit or may comprise SI modifications, ETWS and/or CMAS notifications. In order to balance the size of paging messages and periodicity of paging transmission, the network may configure for a cell, as the cell schematically shown in FIG. 1, more than one cell-specific paging occasion per paging cycle. A UE may be assigned to a specific paging group and may receive the UE-specific paging message at one UE-specific paging occasion out of all available cell-specific paging occasions. Since notifications for ETWS, CMAS and SI modification are expected to be received by all UEs in a cell, BS shall broadcast such notifications over all cell-specific paging occasions in the general paging message.

The paging cycle length and occurrence of the UE-specific paging occasion are set by the network. As an example, in an LTE network, the paging cycle may have a length of 32 radio frames which corresponds to 320 subframes or 320 milliseconds. The paging cycle length may also be of 640 milliseconds, 1280 milliseconds or 2560 milliseconds depending on network configuration. Generally, in a communication network, any other paging cycle length may be possible as well.

A length of a PO in an LTE network may be the length of one subframe or in other words the duration may be of one millisecond. Generally, in a communication network, a PO may have any other duration length. The duration of a PO may be set by the network.

In the RRC_CONNECTED state, the UE may be assigned a DRX time cycle and a DRX active state or active time period which occurs once in a DRX cycle. A DRX active state has generally a predetermined time duration. A predetermined time duration may be a configured initial time duration. The predetermined time duration may be extended. Situations in which the predetermined time duration is extended comprise reception or transmission of a data burst or, more generally, of data during a DRX active state. Another situation is the grant for transmission. Other situations are possible and may depend on the communication network. In other words, while the UE awaits data in its DRX active state, the time duration is fixed and once the UE e.g. receives or transmits a data burst or is granted transmission of data, the time duration of a DRX active state may be extended. The DRX active states are generally separated by DRX inactive periods. Extension of DRX active state may lead to a merge of two neighbouring active states. DRX inactive periods provide a sleep opportunity for the UE which allows saving battery life. In DRX inactive period, the UE can selectively power down modem circuitry and enter a sleep mode.

The DRX active state time period or on-duration time may last, for example in an LTE network, one, two, four, eight or sixteen milliseconds or subframes. More generally, on-duration may be between 1 millisecond and up to 200 milliseconds. More precisely, this may be the predefined on-duration time if the UE does not receive or transmit any data as discussed above and the active state is not extended. The length of the DRX cycle may be, for example, 40, 80, 160 or 320 milliseconds. The DRX cycle length and on-duration time may depend on network configuration. The DRX cycle length and on-duration time may be e.g. selected by the network depending on services required by the UE. Any of the mentioned DRX cycle lengths and on-duration time periods may be combined. It is to be understood that these are only examples of possible cycle lengths and on-duration time periods. Depending on the network, other cycle lengths and other time periods may be possible.

For LTE networks, the RRC protocol defines durations for so-called long and short DRX cycles. There may be a dynamic transition between long and short DRX cycles. The time duration of the active state remains the same for the long as for the short DRX cycles, so that the long DRX cycle has a longer off-duration than the short DRX cycle. Long DRX cycles thus provide a longer sleeping opportunity.

Some definitions as e.g. given in the specification 3GPP 36.304 Ch. 7 for LTE communication networks are used in the following. Radio frames comprising POs are called paging frames. A relation between radio frames and paging frames may be configured by the communication network. T may designate the length of a paging cycle in numbers of radio frames in the paging cycle. The paging cycle is the time span or time duration over which each UE has one dedicated paging occasion. The number of POs in LTE network is given by a parameter nB in relation to T: 4T, 2T, T, T/2, T/4, T/8, T/16, T/32. For example, 4T means that there are four POs in each radio frame. T/2 means that there is one PO every second radio frame. N may designate the number of paging frames given by min (T, nB). This can be illustrated by an example: T may be 32 radio frames or 320 milliseconds long (T=rf 32). The number of paging frames in the paging cycle nB may be T/2. Then there are 16 paging frames in one paging cycle. LTE standards fix the subframes in a paging frame in which the POs occur. For example, for nB=4T, the POs are in subframes 0, 4, 5 and 9, for nB=T/2, the PO is in subframe 9 every second radio frame.

The UE 12.1 in FIG. 1 may e.g. be in an RRC_IDLE state. In other words, the UE 12.1 may not receive any data communication, but may monitor UE-specific paging messages, waiting for example to establish mobile terminated call or monitoring for possible occurrence of a warning message like ETWS or CMAS.

The UE 12.2 may be in an RRC_CONNECTED state. In other words, the UE 12.2 may have received a request to establish a mobile terminated call in a dedicated or UE-specific paging message during an idle mode, may have established the connection and waits for a scheduled information. The scheduled information may, for example, correspond to a voice over internet protocol (VOIP) call or other applications utilizing bursts of data. The UE 12.2 is assigned a DRX cycle with DRX active periods of predetermined time duration. If a data burst or, more generally, data is received during a DRX active state the time duration may be extended.

The UE 12.2 may still be required to detect and to apply SI modifications as well as ETWS and CMAS notifications. Thus, although the UE 12.2 is in an RRC_CONNECTED state and does not need to wait for a UE-specific paging message, it may still need to decode paging messages. Depending on network configuration, DRX cycle and paging cycle may not correspond to each other neither in cycle length nor in starting time.

Figure 2:
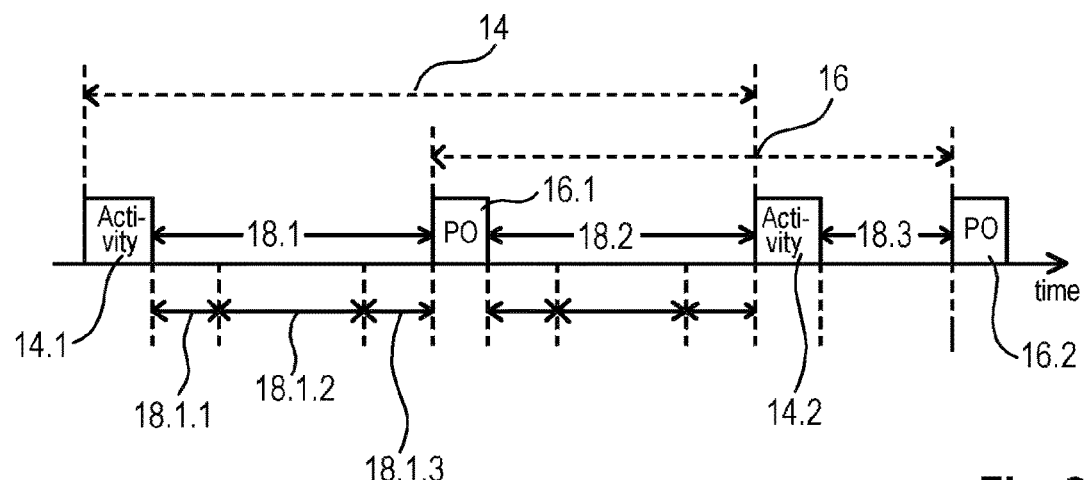
FIG. 2 schematically illustrates in a time diagram occurrence of DRX active states and dedicated paging occasions.

FIG. 2 illustrates in a time diagram an exemplary relation between a DRX cycle 14 and a paging cycle 16 assigned for example to the UE 12.2. The DRX cycle 14 may be longer than the paging cycle 16. The DRX cycle 14 and the paging cycle 16 may be offset to each other, i.e. they may not start at the same time. The DRX cycle 14 starts with a time period 14.1 which is a DRX active state time period. The default paging cycle 16 starts with a paging occasion 16.1. In the example shown in FIG. 2, there is only one PO per paging cycle. It is a UE-specific paging occasion. The DRX cycle 14 and the paging cycle 16 are periodically repeated. FIG. 2 shows a further DRX active state 14.2 at a beginning of a next DRX cycle and a further PO 16.2 at a beginning of a next paging cycle.

As explained above, outside of the time periods 14.1 and 14.2 which designate DRX active states, and outside paging occasions 16.1 and 16.2, the UE may be in a sleep mode. A first sleep mode time 18.1 is situated between the end of active state 14.1 and the beginning of paging occasion 16.1. The sleep mode time 18.1 may comprise three distinct time periods. A first part or distinct time period 18.1.1 corresponds to a power down time in which the modem including for example the baseband and RF circuits is powered down. A second part or distinct time period 18.1.2 corresponds to a period where the LTE modem is really sleeping, baseband and RF circuits are without power. Some time before a start of the PO 16.1 the circuitry of the LTE modem (e.g. baseband and RF circuits) starts to power up, this is the third part or distinct time period 18.1.3. A second sleep mode time period 18.2 is situated between the end of the PO 16.1 and the beginning of the DRX active state 14.2. Again, sleep mode time period 18.2 may be separated into the three distinct periods of power down, sleeping time and power up. A third sleep mode time period 18.3 is situated between the end of the DRX active state time period 14.2 and the beginning of the PO 16.2. In the example illustrated in FIG. 2, the time period 18.3 may be shorter than the time periods 18.1 and 18.2. Especially, the time period 18.3 may be shorter than the time periods of power down and power up together. In this case, the sleep mode cannot be entered and the UE 12.2 must stay awake. No energy saving is possible. It is to be understood that baseband and RF circuits are among the main contributors to power consumption in a UE. Without powering down, the battery life is shortened.

The POs 16.1 and 16.2 may be the UE-specific paging occasions which the UE 12.2 is monitoring when in RRC_IDLE state. It can easily be seen that if the PO 16.1 and 16.2 were not to be monitored the UE could remain asleep between two active states 14.1 and 14.2. As PO must be monitored to get alert or urgency messages and as POs are not aligned with DRX active states, the UE 12.2 is obliged to awake once between the two DRX active states 14.1 and 14.2. In some cases, depending on the different lengths of DRX cycle and paging cycle, the UE 12.2 may even be obliged to rest awake between the DRX active state 14.2 and the paging occasion 16.2.

Figure 3:
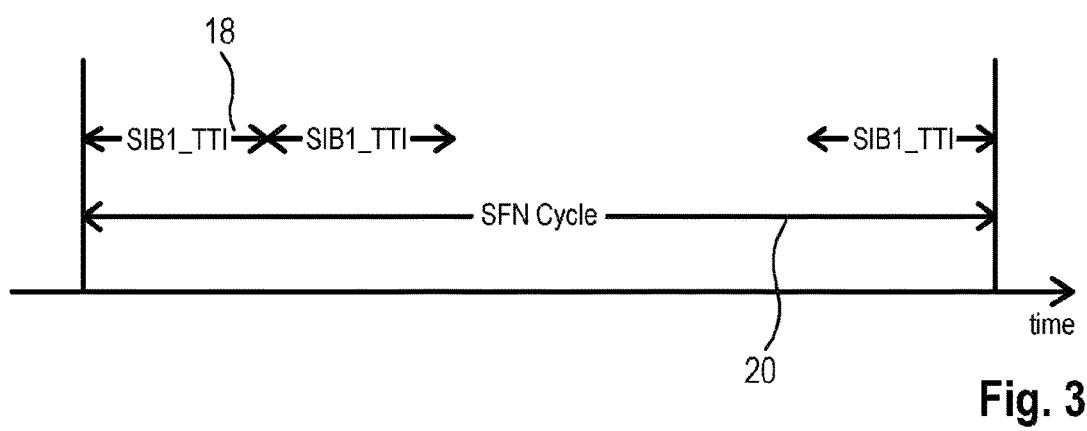
FIG. 3 schematically illustrates in a time diagram system information blocks in an SFN cycle.

FIG. 3 shows in a time diagram a further time structure which may be provided in a communication network. It is a structure of a system frame number (SFN) cycle with a duration of 1024 radio frames corresponding to 10,240 milliseconds or 10.24 seconds as specified for example in LTE standards. The SFN cycle may be divided into 128 SIB1_TTI (system information block 1_transmission time intervals) of 80 milliseconds each. The SIB1 is always broadcast in LTE network because it contains basic information to camp on a cell. In each SIB1_TTI there are four transmission occasions to create data redundancy. In other words, every 20 milliseconds there is an opportunity to receive an SIB1. The SIB1 may contain information that, to a limited extent, duplicates the content of the general paging messages common to all user equipment. Especially, the SIB1 may contain information indicating a system information modification or indicating scheduling of ETWS and/or CMAS warnings. The importance of the SIB1 for getting alert messages is discussed below.

Figure 4:
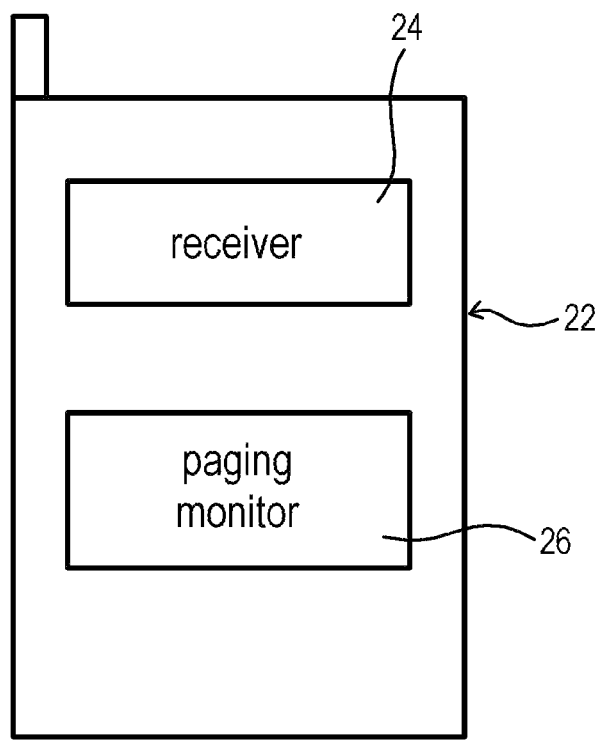
FIG. 4 schematically illustrates a block diagram of a user equipment according to a first embodiment.

FIG. 4 shows a UE 22 according to a first embodiment. The UE 22 comprises a receiver 24 and a paging monitor 26. The UE 22 may comprise one or more non-transitory computer readable media and a processor. The computer readable media may comprise non-volatile memories. The receiver 24 may be configured to operate in an RRC_CONNECTED state with assigned DRX cycle and DRX active state time periods. The computer readable media may comprise program instructions which cause the processor to start at a predefined time into a DRX active state. The paging monitor 26 may be configured to check whether a paging message has already been read in a current paging cycle. The computer readable media may comprise program instructions which cause the processor to check whether a paging message has already been read in a current paging cycle. The paging monitor 26 may be configured to read a paging monitored flag. The paging monitor 26 may be configured to set a paging monitored flag to FALSE at a beginning of a predefined paging cycle. The computer readable media may comprise program instructions which cause the processor to check whether a paging message is to be received in the DRX active state and to read the paging message during the DRX active state if no paging message has been read in the current paging cycle.

Functions and functionality of the UE 22 are further discussed based on exemplary network configurations as shown in FIGS. 5A-5C.

FIG. 5A shows in a time diagram a exemplary LTE network configuration in which the UE 22 may function or operate. At a time to a paging cycle 28 starts. At a time $t_1$ the paging cycle 28 ends. The paging cycle 28 may have a length of 32 radio frames. FIG. 5A shows six radio frames out of the 32 radio frames of the paging cycle 28. The number N of paging frames in paging cycle 28 may be T/2=16 paging frames. Each paging frame 30.1 is therefore followed by a radio frame 30.2. Further, in the example shown in FIG. 5A paging occasions 32 occurring in each paging frame 30.1 are on subframes 9. It is to be understood that any of the paging occasions 32 comprise a same general paging message part. It is further to be understood that only one out of the paging messages 32, shown in FIG. 5A, is the UE-specific PO which the UE 22 is configured to monitor in an RRC_IDLE state comprising additionally a UE-specific paging message part.

The UE 22 may be assigned a DRX cycle of 16 milliseconds with DRX active state time periods 34.1, 34.2, 34.3, 34.4 and 34.5. comprised in the six radio frames 30.1, 30.2 of the paging cycle 28 shown in FIG. 5A. In the example shown in FIG. 5A the on-duration of the active states 34.1-34.5 is of 2 milliseconds or 2 subframes.

At the time to, the current paging cycle 28 starts. When entering the active state 34.1, the paging monitor 26 checks whether a paging message and more specifically a general paging message has already been read in the current paging cycle. In the first millisecond of the current paging cycle 28 the paging message was not yet read. As the paging monitor 26 determines at the beginning of the active state 34.1 that the paging message was not yet read, the paging monitor 26 checks whether a paging message is to be received in the current DRX active state 34.1. According to the time diagram of FIG. 5A, this is not the case. None of the POs 32 is during the time duration of active state 34.1. The paging monitor 26 continues to perform the check whether a paging message, more specifically the general information part of a paging message has already been read in the current paging cycle at the start of each active state 34.2, 34.3. The check is negative for DRX active states 34.2, 34.3.

When entering the active state 34.4, the paging monitor determines that there is still no paging message read in the current paging cycle 28. In contrast to the previous active states however, the paging monitor 26 determines that a paging message is to be received in the current DRX active state 34.4. A PO 32.1 which is on a subframe 9 is at the same time as the DRX active state 34.4.

The paging monitor 26 is configured to read the paging message comprised in the PO 32.1 which is at the same time as the active state 34.4. In other words, the UE 22 reads the general information comprised in the paging message while in a power-on state because of the DRX active state. There is no need for the UE 22 to be awaken especially for the UE-specific PO.

The paging monitor 26 may continue to check at each beginning of a further active state 34.x whether a paging message has already been read in the current paging cycle. The answer is "yes" and therefore no further reading of a paging message is necessary, even if possible. For example, in the active state 34.5, which is shown in FIG. 5A as being the last DRX active state before the end of the current paging cycle 28, the PO 32.2, which is at the same time as the active state 34.5, may not be used to read the general information comprised therein.

In an embodiment, the paging monitor 26 may be configured to set at a time to a paging monitored flag to FALSE. Meaning of this flag is that a paging message has not yet been read in the current paging cycle. At a beginning of the active states 34.1-34.3, the paging monitor 26 reads the paging monitored flag. As the paging monitored flag is FALSE, the paging monitor 26 checks whether there is a paging message to be read. In other words, the paging monitor 26 checks whether there is a PO at the same time as the active state. The paging monitor 26 may be further configured to set the paging monitored flag to TRUE after reading the paging message during e.g. the active state 34.4. Afterwards, until the end of paging cycle 28, the paging monitor 26 still checks the paging monitored flag. As the flag is set to TRUE, the paging monitor 26 does not try to read a further paging message. At a time $t_1$ a new paging cycle starts and the paging monitored flag is again set to FALSE.

In a further embodiment, the paging monitor 26 may be configured to define a new start of a paging cycle. For example, the paging monitor 26 may be configured to start a new paging cycle once the paging message has been read. In a network configuration as shown in FIG. 5A, the paging monitor 26 may start a new paging cycle after the active state of 34.4, because it is during active state 34.4 that the paging message is read. The new paging cycle which is not illustrated in FIG. 5A may have the same length as the paging cycle 28. The paging monitor 26 may effectuate the same checks as described before and further explained with reference to FIG. 6. In an embodiment where a new paging cycle is started, the use of paging monitored flags may not be necessary. Instead of setting the paging monitored flag to TRUE, a paging cycle timer may be set to 0.

Starting a new paging cycle as described above, may have the consequence that too many paging messages are read. In other words, a consequence may be that the paging cycle lengths become shorter than the predefined paging cycle length. In further embodiments, the paging monitor 26 may therefore be configured to determine how many POs are still available before the end of the current paging cycle before reading a paging message. In another further embodiment, the paging monitor 26 may be configured to determine how many POs will collide with the on-duration or time period of active state. In another further embodiment, the paging monitor 26 may be configured to determine how often there is a PO during a paging cycle that will collide.

FIG. 5B shows another exemplary paging configuration as explained with reference to FIG. 5A. A paging cycle 28 has a paging cycle length of 32 radio frames. The parameter nB is set to 4T, every radio frame is therefore a paging frame with four paging occasions at the subframes 0, 4, 5 and 9. The example shown in FIG. 5B differs further from the example of FIG. 5A in the DRX configuration. A DRX cycle length is changed with reference to FIG. 5A. The DRX cycle length in FIG. 5B is of 10 milliseconds. This is a radio frame length. The DRX active state time period or on-duration time is of 2 milliseconds as in FIG. 5A. An offset of the DRX cycle in FIG. 5B compared to the paging cycle is of 1 ms. Therefore, in this configuration, no PO falls into the DRX active state time periods as can easily be seen in the time diagram of FIG. 5B.

According to an embodiment, the paging monitor 26 may be further configured to set a guard time period. The guard time period may be shorter than the paging cycle length and may end as shown in the example of FIG. 5B at a time $t_G$ which is e.g. one paging frame length before the end of paging cycle 28. It is to be understood that this is a non-limiting example and the guard time period may end at another time $t_G$. The paging monitor 26 may be configured to monitor the guard time. In an embodiment, if the guard time period is finished and a paging monitored flag is still set to FALSE a DRX active state following the guard time period may be extended until a PO has occurred and the paging message has been read. It may be the first DRX active state following the guard time period which is extended. It may be the last DRX active state in the paging cycle which is extended. In another embodiment, if the guard time period is finished and the paging monitor 26 ascertains that the paging message was still not read, the first DRX active state following the guard time period may be extended until a PO has occurred and the paging message has been read. In the example shown in FIG. 5B, the active state time period 34.2 is extended from 2 milliseconds to 4 milliseconds to be able to read the paging message during the PO 32.3 occurring in subframe 4. In this configuration, a paging message is read during the paging cycle and the UE must not awake especially for a paging occasion but remains longer awake.

FIG. 5C shows the same paging cycle configuration as FIG. 5A. The paging cycle 28 is the same. FIG. 5C shows the same DRX cycle configuration as FIG. 5B, i.e. the DRX cycle is set to 10 milliseconds. As in the example of FIG. 5B, the first two DRX active states 34.1 and 34.2 after the start of the paging cycle 28 occur when there is no PO 32. In the third active state 34.3, the UE 22 e.g. receives or transmits data. Therefore, the DRX active state 34.3 is extended over more than the predetermined 2 milliseconds. In the example shown in FIG. 5C, the on-duration time of the active state 34.3 is about 12 milliseconds. In fact, the on-duration time is extended so far that the predetermined following DRX active state is included. Or in other words, two DRX active states form together one DRX active state without a DRX inactive state inbetween. The paging monitor 26 attempts during all the DRX active time period to read a paging message. Therefore, the paging monitor 26 reads the paging message included in the PO 32.4 in subframe 9 of the second paging frame 30.1. Thus, when arriving at the guard time to, there is no need to extend the last active state time period because the paging message was already read during the paging cycle 28.

In an embodiment, in which the paging monitor is configured to set a paging monitored flag, the paging monitored flag may be set to TRUE at the end of the active state 34.3, i.e. after reading of the paging message. In an embodiment without use of a paging monitored flag, the paging monitor 26 may determine in any other suitable way that the monitored paging message was already read.

The example of FIG. 5C illustrates that it might not be sufficient to determine at a start of a paging cycle based of the current network configuration whether paging occasion will occur during an active state. On one side, an active state on-duration may be extended due to data transfer which is not related to paging. On another side, DRX cycle length may be changed due to a transition from a short DRX cycle to a long DRX cycle.

To check every time whether a general message has already been read may have a further advantage. It is possible that during a PO falling into an active state time period, the paging monitor 26 is not capable to read the paging message, for example due to difficult radio transmission conditions. It is to be understood that on wireless communication network radio conditions are varying.

The embodiments described above may have the further advantage to adapt to different network configurations. In the exemplary LTE network there is a wide range of configuration possibilities. In other communication networks further configurations may be possible. Furthermore, the embodiments described herein adapt easily to difficult reception conditions, to variations in the network configurations. The proposed methods and UEs ascertain that a general paging message is read at least once in a paging cycle.

Figure 6:
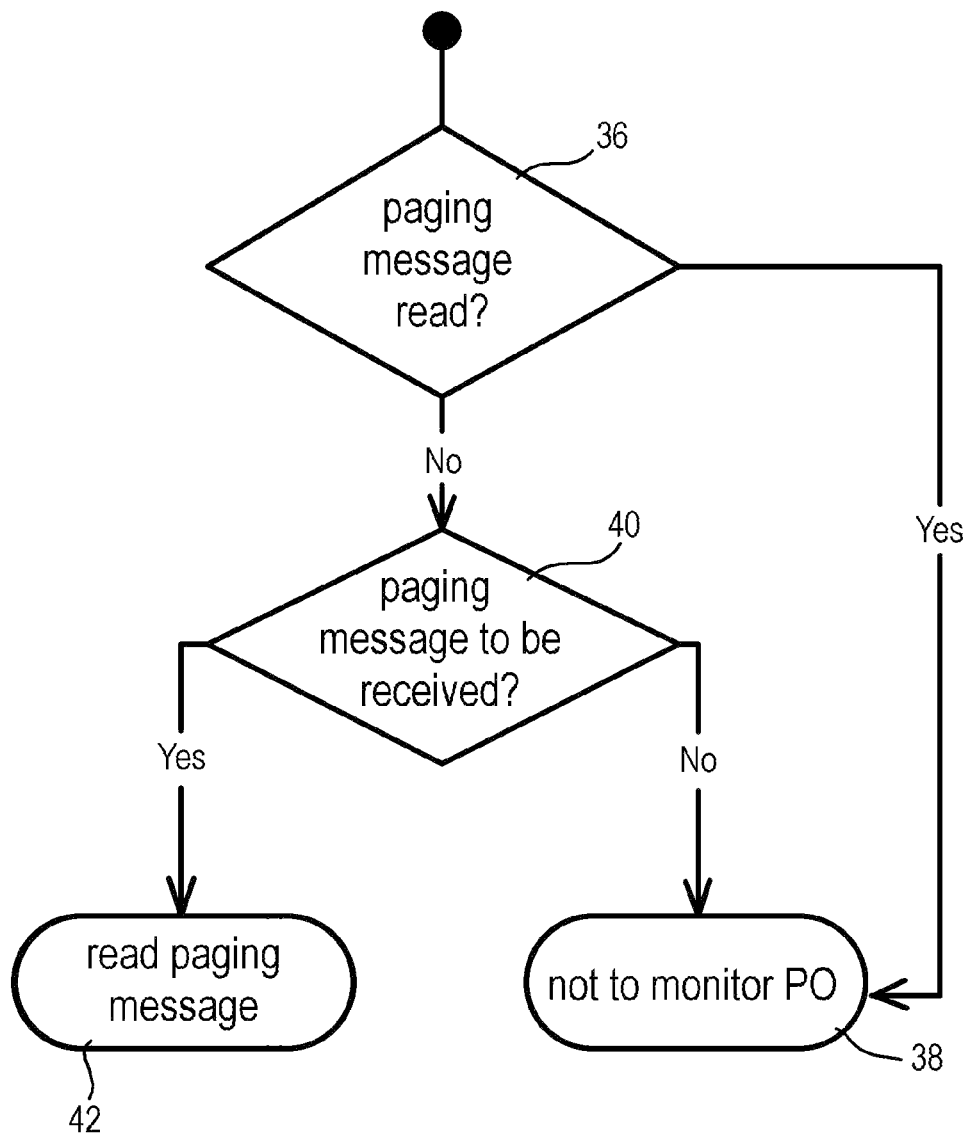
FIG. 6 schematically illustrates a flow diagram of a possible function of the user equipment shown in FIG. 4.

FIG. 6 illustrates in a flow diagram a method of checking for and reading of paging messages and more specifically of general paging messages or general information included in the paging messages as explained with reference to FIGS. 4 and 5. When entering a DRX active state, a paging monitor, possibly the paging monitor 26 of FIG. 4, ascertains whether a paging message has already been read (36). If the answer is "yes", POs are not to be monitored and there is no need to read any paging message (38). If the answer is "no", the paging monitor 26 checks whether a paging message is to be received in the current DRX active state time period (40). The paging monitor 26 is configured to read the paging message if the answer is "yes" (42). If the answer to the question whether a paging message is to be received in the current DRX active state time period is "no", the paging monitor 26 does not need to monitor the PO (38). If the answer to the question whether a paging message is to be received in the current DRX active state time period is "yes", the paging monitor 26 reads the paging message (42).

Figure 7:
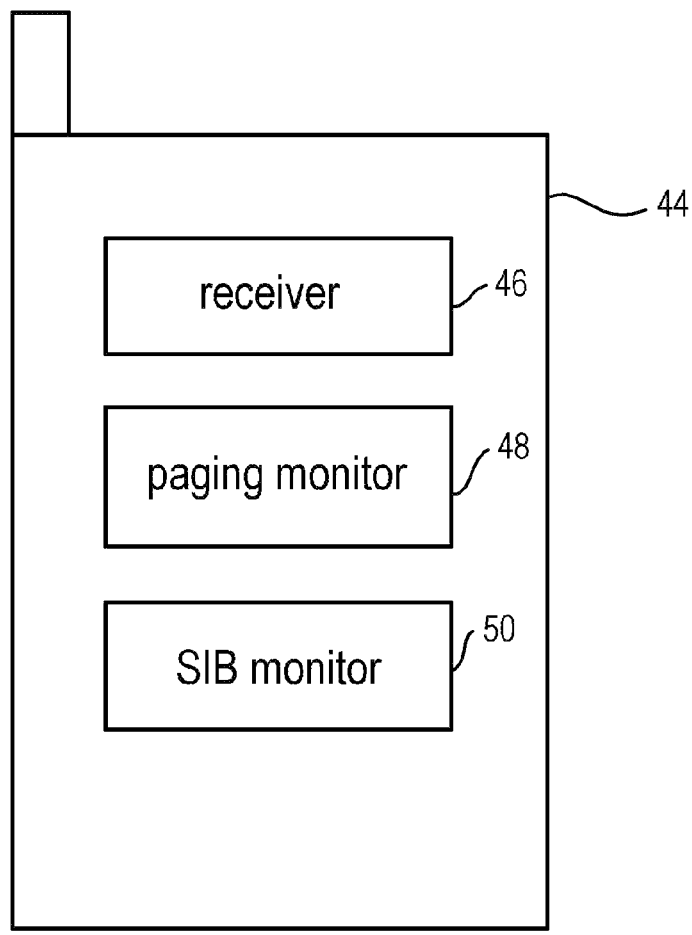
FIG. 7 schematically illustrates a block diagram of a user equipment according to a second embodiment.

FIG. 7 shows a UE 44 according to another embodiment. The UE 44 may comprise a receiver 46, a paging monitor 48 and a system information block monitor 50. The UE 44 may comprise one or more non-transitory computer readable media and a processor. The computer readable media may comprise program instructions which cause the processor to perform functions of the UE 44 or more specifically functions of at least one out of the receiver 46, the paging monitor 48 and the system information block monitor 50 as described herein. The receiver 46 is configured to operate in an RRC_CONNECTED state with predefined DRX active state time periods as explained above. The receiver 46 may be essentially the same as the receiver 24 in FIG. 4. The paging monitor 48 may essentially correspond to the paging monitor 26 in FIG. 4. The system information block monitor 50 may be configured to monitor a system information block (SIB) and more specifically in an LTE system a system information block 1. An SIB1 is illustrated in FIG. 3. By providing the UE 44 with an SIB monitor 50, there is a further possibility to get information about an alert case. Although the UE 44 is shown to comprise a paging monitor 48, it is to be understood that embodiments may also comprise a UE comprising a receiver and an SIB monitor without a paging monitor. Functions and functionality of the SIB monitor 50 are further explained with reference to FIGS. 8 and 9.

Figure 8:
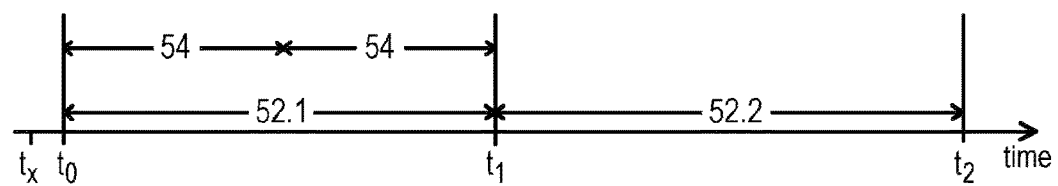
FIG. 8 schematically illustrates a time diagram of a possible relation between a paging cycle and a system information modification cycle and a trigger of a system modification.

FIG. 8 illustrates function of the SIB monitor 50 in case of a decision to update system information. FIG. 8 is a time diagram showing system information (SI) modification cycles 52.1 and 52.2 and paging cycles 54. In the non-limiting example of FIG. 8, the length of a paging cycle 54 is half the length of an SI modification cycle 52.1, 52.2. At a time $t_x$, a decision may be taken from the network, for example an LTE network, to update system information. A first SI modification cycle 52.1 after the time $t_x$ starts at a time $t_0$ and ends at a time $t_1$. During the time period between $t_0$ and $t_1$, two paging cycles 54 are transmitted. During the first SI modification cycle 52.1, i.e. between $t_0$ and $t_1$, all cell paging occasions broadcast the modification indication in the general paging message. As the SI modification cycle 52.1 comprises two default paging cycles 54, each UE regardless if in RRC_IDLE or in RRC_CONNECTED state has at least two opportunities to detect the modification indication. In other words, a UE comprising a paging monitor should read during the first or the second paging cycle 54 the indication of a SI modification.

However, it is possible that, for example due to difficult radio conditions, the general paging message comprising the SI modification indication is not read by a UE. In the following SI modification cycle 52.2 starting at time $t_1$, the system information may be modified. Further, a so-called system-info-value-tag may be incremented for signaling the modification. Once the system-info-value-tag in SIB1 is incremented, the SIB monitor 50 can detect that the system info has been modified by reading the SIB1 and the system-info-value-tag therein. The SIB monitor 50 may for example compare the system-info-value-tag read with a previously received system-info-value-tag.

Another reason why a UE may not have read the paging message is a change of the UE between two cells. In this case, the SIB monitor 50 may store the SI of the previous serving cell and the current serving cell in case UE performs reselections between these two cells. The SIB monitor 50 may then use the stored information and prove its validity by receiving SIB1 and compare the system-info-value-tag.

Figure 9:
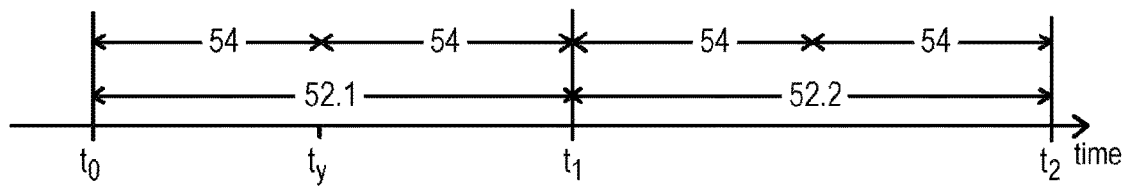
FIG. 9 schematically illustrates a time diagram of a possible relation between a paging cycle and a system information modification cycle and a trigger of emergency broadcast.

FIG. 9 illustrates function of the SIB monitor 50 in case of an emergency broadcast according to ETWS and/or CMAS. FIG. 9 is a time diagram showing SI modification cycles 52.1 and 52.2 and paging cycles 54. In the non-limiting example shown in FIG. 9 one Si modification cycle 52 comprises two paging cycles 54. A first SI modification cycle 52.1 starts at a time $t_0$ and ends at a time $t_1$. The next SI modification cycle 52.2 starts at time $t_1$ and ends at a time t2. At a time $t_y$, an emergency broadcast may be given. Time $t_y$ lies somewhere in between $t_0$ and $t_1$. Upon trigger of an emergency broadcast at the time $t_y$, all general paging messages are updated to comprise an indication of the emergency situation. Updating of the paging messages can be done as soon as possible even in the middle of a paging cycle 54. If a UE detects a paging message once in a paging cycle it may need at maximum a paging cycle length for a UE to get the emergency information in case of undisturbed radio conditions by reading the general paging message.

The SIB1 is updated after the trigger at $t_y$ to include a schedule of warning SIBs. The warning SIBs themselves may be SIB10, SIB11 and SIB12. These updates can be done every 80 milliseconds. Therefore, it is probable that the indication on SIB1 earlier than the information via paging message. Once the UE receives a warning indication in a general paging message, it is forced to refresh SIB1 to find the scheduling of warning SIBs broadcast for more information. Paging is not changed by this event. UE continues to receive paging messages.

In contrast to the case of system information explained with reference to FIG. 8, the system-info-value-tag is not updated in case of warning SIBs. Hence, for the case described in FIG. 9, detection of a change of system-info-value-tag is not an alternative to paging.

However, the warning SIBs schedule can be detected in SIB1. It is to be reminded that SIB1 is transmitted every 20 milliseconds. A delay of updates may be of 80 ms for SIB1, or in other words, the time of one TTI. Therefore, receiving SIB1 can improve performance of paging occasion selection method. It avoids a negative impact of lost paging.

Figure 10:
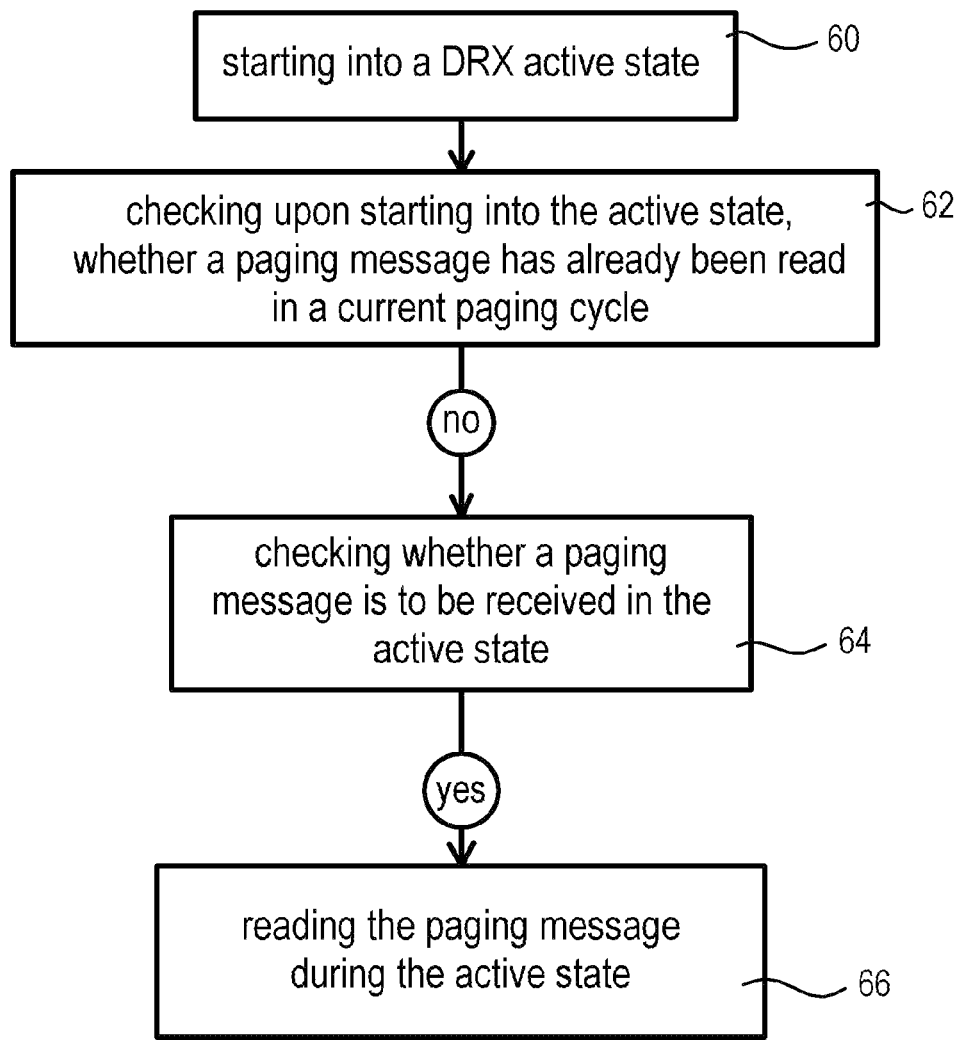
FIG. 10 schematically illustrates a flow diagram of a method according to a first embodiment.

FIG. 10 schematically illustrates in a flow diagram a method according to a first embodiment. The method may be performed by a UE which may correspond to any of the UEs 12, 22 or 44. The UE, which may be configured for discontinuous reception operation in a wireless communication network, may start at 60 into a DRX active state. During the active state it may be checked whether a paging message has already been read in a current paging cycle (62). More specifically, it is the general part or the general information of the paging message which is to be read. For effectuating the check, means may be provided in the UE. The check may be effectuated by a paging monitor. If the answer to the check is "no", i.e. if no paging messages has been read in the current paging cycle, it is checked at 64 whether a paging message is to be received in the current active state. For effectuating the check, appropriate means may be provided in the UE. The check may be effectuated by a paging monitor. If this check is answered by "yes" then at 66 the paging message is read during the active state. In other words, it is not necessary that the UE must awake or stay awake to read the paging message. It is to be reminded that the paging cycle and the DRX cycle are completely separated and independent from each other and that changes in the DRX active state time periods may occur at all times by a change, for example, to long DRX cycle coming from a short DRX cycle or by extended active state time periods due to data transmission activities.

Figure 11:
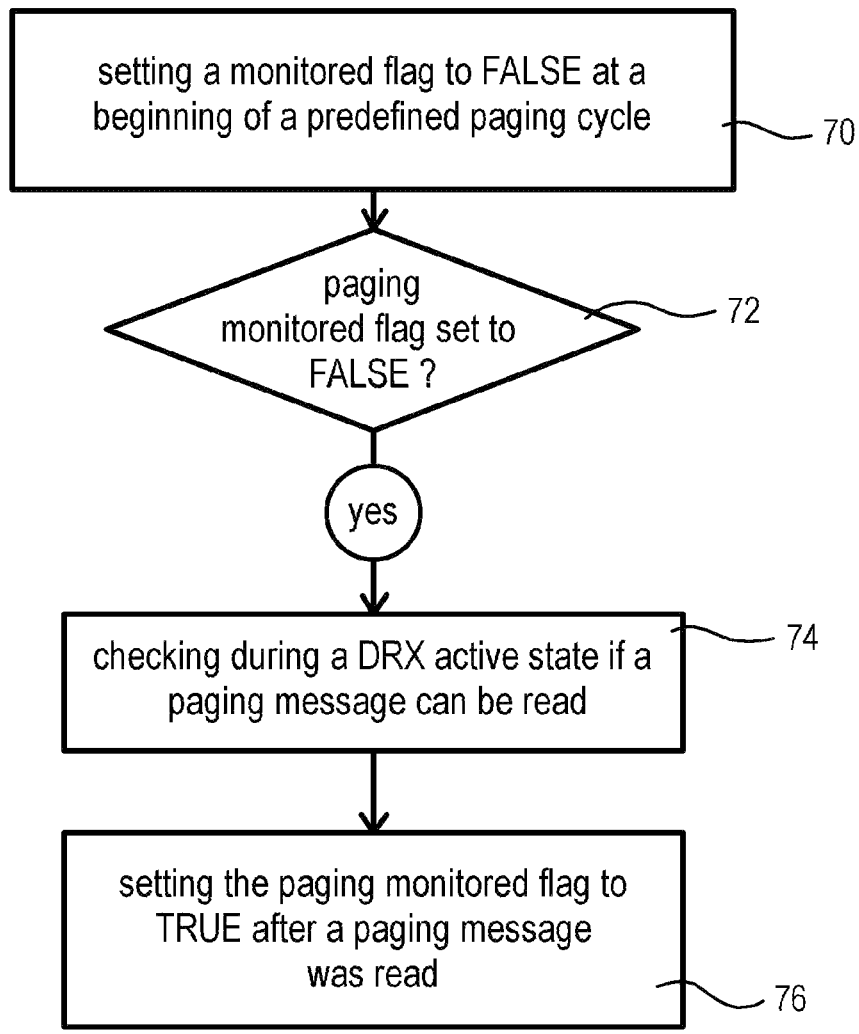
FIG. 11 schematically illustrates a flow diagram of a method according to a second embodiment.

FIG. 11 shows in a schematic flow diagram a method according to a second embodiment. The method may be performed by a UE which may correspond to any of the UEs 12, 22 or 44. At a beginning of a predefined paging cycle, a paging monitored flag is set to FALSE at 70. It may be checked whether the paging monitored flag is set to FALSE at 72. For effectuating the check, means may be provided in the UE. The check may be effectuated by a paging monitor. If the answer to this question is "yes", it may be checked during a DRX active state if a paging message can be read at 74. For effectuating the check, means may be provided in the UE. The check may be effectuated by a paging monitor. At 76 the paging monitored flag is set to TRUE after a paging message was read. Using a paging monitored flag may facilitate checking whether a paging message has already been read during a paging cycle.

Figure 12:
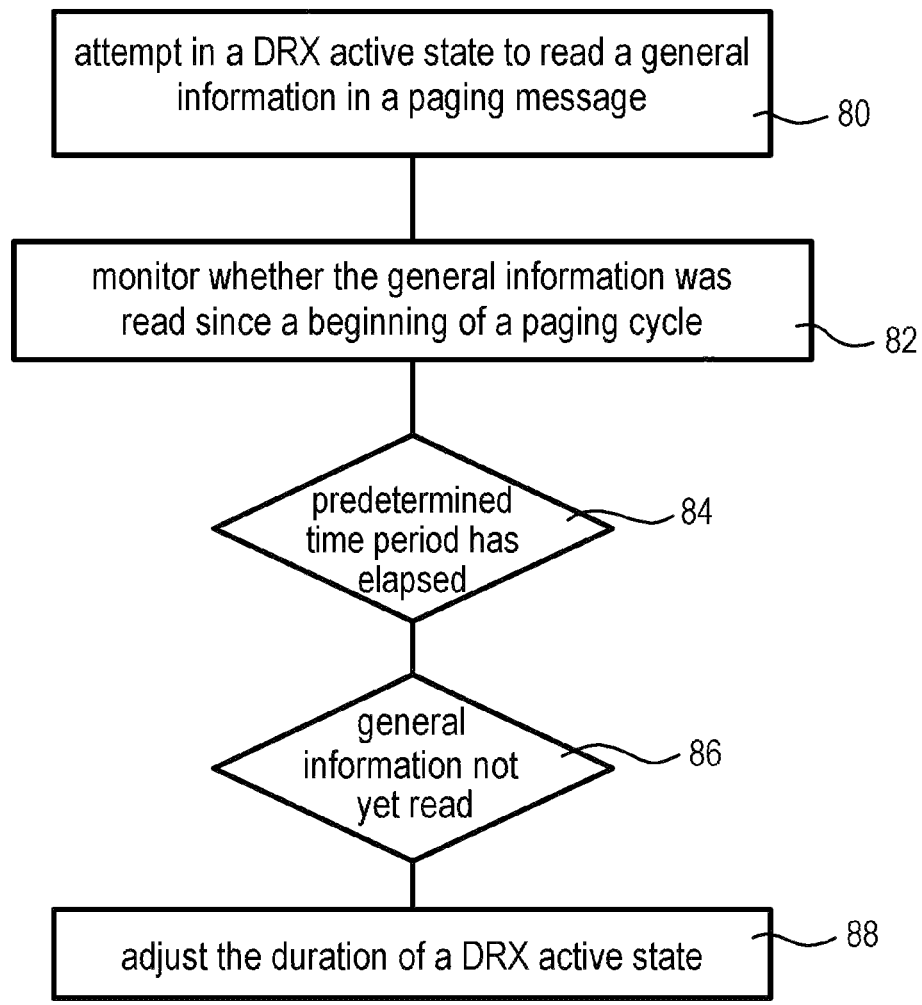
FIG. 12 schematically illustrates a flow diagram of a method according to a third embodiment.

FIG. 12 shows in a flow diagram a method according to a third embodiment. The method may be effectuated, for example, by the paging monitor 26 of FIG. 4 or the paging monitor 48 of FIG. 7. More generally speaking, means may be provided to perform the method. In a DRX active state, it may be attempted to read at 80 a general information comprised in a paging message. A general information in a paging message is also called in this application a general paging message. At 82 it may be monitored whether the general information was read since the beginning of a paging cycle or, more precisely, since the beginning of a current paging cycle. At 84 it may be checked whether a predetermined time period has elapsed. The predetermined time period may be a guard time period as discussed with reference to FIG. 5B. At 86 it is checked whether the general information of a paging message has not yet been read. If this is true, the duration of a DRX active state is adjusted in 88. Adjusting the duration of the DRX active state is, for example, explained with reference to FIG. 5B. Extending the duration of the DRX active state allows monitoring the next PO and reading the next paging message without the necessity for the UE to awake from a sleep mode.

Table 1 shows as an example the network configurations currently used by different wireless communication networks. The parameters nB, T and paging occasions per cycle are indicated. It can be seen that nB varies between T/4 and 2T. T itself varies between 32 and 128. This leads to paging occasions per cycle varying from 16 to 128.

TABLE 1

|  | Network 1 | | Network 2 | | Network 3 | Network 4 | | | |
| --- | --- | --- | --- | --- | --- | --- | --- | --- | --- |
| nB | T/4 | T | T/4 | T | T/4 | 2T | T | 2T | T |
| T |  | 128 | 64 | 128 | 64 | 32 |  | 64 | 128 |
| PO per cycle | 32 | 128 | 16 | 128 | 16 | 32 | 64 | 64 | 128 |

It may be an advantage of the proposed method and user equipment that it can easily adapt to all different configurations. The power saving achieved for a UE which is in RRC-CONNECTED varies depending on DRX cycle length and on-duration in milliseconds.

As an example, Table 2 shows the power saving for T=64 for different DRX cycle length and different on-durations all in milliseconds.

TABLE 2

| T = 64 | onDuration in ms | | | | |
| --- | --- | --- | --- | --- | --- |
| DRX cycle | 1 | 2 | 4 | 8 | 16 |
| 40 | 6.25% | 3.13% | 1.56% | 0.78% | 0.39% |
| 80 | 12.5% | 6.25% | 3.13% | 1.56% | 0.78% |
| 160 | 25% | 12.5% | 6.25% | 3.13% | 1.56% |
| 320 | 50% | 25% | 12.5% | 6.25% | 3.13% |

It can be seen that especially for short on-durations and long DRX cycles the power saving can be as high as 50% compared to monitoring the UE-specific paging occasions, i.e. the POs which are monitored by this UE in the RRC_IDLE state.

The condition T=64 specifies that there are 64 radio frames in a default paging cycle. Or in other words, the paging cycle has a length of 640 milliseconds. A power saving of 50% is obtained with a DRX cycle of 320 milliseconds (see last line of table 2). When a paging cycle has a length of 640 ms and a paging cycle a length of 320 ms there are two DRX cycles in one paging cycle. According to the first column of table 2, the on-duration is of 1 ms per DRX active state which means a total on-duration of 2 ms during a paging cycle. This is a configuration with a relative long DRX cycle and a relative short on-duration which comes to emulating a behavior of a UE during an RRC_IDLE state. However, the UE is maintained in an RRC_CONNECTED state to avoid time delay during connection establishment.

The parameter R may specify the ratio of DRX cycles in one paging cycle. Then 1/R gives the numbers of DRX cycles contained in a paging cycle. The parameter D may refer to the length of on-duration or the time period of active state in milliseconds. Conventionally, the UE must be active during a paging cycle at least D milliseconds per number of paging cycles plus one millisecond for additionally monitoring a paging occasion: D/R+1. When it is possible to monitor the PO during an active state, then LTE modem must only be active for D milliseconds multiplied by the number of DRX cycles in a paging cycle: D/R.

The provided examples are not to be considered to be limiting. The provided examples illustrate the variability of the communication networks configuration and the ability of the proposed method to adapt to all configurations. The following examples pertain to further embodiments.

Example 1 is a user equipment for discontinuous reception (DRX) operation in a wireless communication network, the user equipment comprises a receiver configured to operate in an RRC-connected state with predefined DRX active state time periods; and a paging monitor configured to check whether a paging message has already been read in a current paging cycle; and if no paging message has been read in the current paging cycle, configured to check whether a paging message is to be received in a current DRX active state time period; and read the paging message during the current DRX active state time period.

In example 2, the subject-matter of example 1 can optionally include that the paging monitor is further configured to read a paging monitored flag.

In example 3, the subject-matter of any of examples 1 or 2 can optionally include that the paging monitor is further configured to set a paging monitored flag to FALSE at a beginning of the predefined paging cycle.

In example 4, the subject-matter of example 3 can optionally include that the paging monitor is further configured to set the paging monitored flag to TRUE after the paging message was read.

In example 5, the subject-matter of any of examples 1 to 4 can optionally be configured to start a new paging cycle after the paging message was read.

In example 6, the subject-matter of any of examples 1 to 5 can optionally include that the paging monitor is further configured to set a guard time period, the guard time period being shorter than the paging cycle time period; and extend a duration of a DRX active state following the guard time period if the paging message has not yet been read in the current paging cycle.

In example 7, the subject-matter of any of examples 1 to 6 can optionally include a system information block monitor configured to monitor a system information block during a DRX active state for detecting an information also included in a general paging message.

Example 8 is a user equipment for discontinuous reception (DRX) operation in a wireless communication network, wherein the user equipment comprises: a receiver configured to operate in an RRC-connected state with predefined DRX active state time periods; and a paging monitor configured to attempt in a DRX active state time period to read a paging message; monitor whether the paging message was read since a beginning of a paging cycle; and if the paging message was not read adjust the duration of a DRX active state time period after a predetermined time period has elapsed since the beginning of the paging cycle, the predetermined time period being shorter than the duration of the predetermined paging cycle.

In example 9, the subject-matter of example 8 can optionally include that the paging monitor is further configured to read any paging message regardless whether the paging message is included in a paging message dedicated to the user equipment or in a cell specific paging message.

In example 10, the subject-matter of any of examples 8 or 9 can optionally include that the paging monitor is further configured to set and to read a paging monitored flag.

In example 11, the subject-matter of any of examples 8 to 10 can optionally be configured to start a new paging cycle after the paging message was read.

In example 12, the subject-matter of example 11 can optionally be further configured to base a decision whether a paging message in a DRX active state is to be read on at least one of the following considerations: —how many occasions for reading the paging message are still available before an end of this paging cycle; —how many occasions for reading the paging message are within a DRX active state; —how often are occasions within a DRX active state.

Example 13 is a user equipment for discontinuous reception (DRX) operation in a wireless communication network, the user equipment comprises: a receiver configured to operate in an RRC-connected state with predefined DRX active state time periods; and means to check whether a paging message has already been read in a current paging cycle; means to check whether a paging message is to be received in a current DRX active state time; and means to read the paging message during the current DRX active state time period.

Example 14 is a method performed by a user equipment for discontinuous reception (DRX) operation in a wireless communication network, wherein the user equipment is in an RRC-connected state, the method comprising: starting at a predefined time into a DRX active state; checking whether a paging message has already been read in a current paging cycle; and if no paging message has been read in the current paging cycle checking whether a paging message is to be received in the DRX active state; and reading the paging message during the DRX active state.

In example 15, the subject-matter of example 14 can optionally include that checking whether a paging message has already been read in the current paging cycle is effectuated by reading a paging monitored flag.

In example 16, the subject-matter of any of examples 14 and 15 can optionally include at least one out of setting a paging monitored flag to FALSE at a beginning of the predefined paging cycle and setting the paging monitored flag to TRUE after reading the paging message.

In example 17, the subject-matter of any of examples 14 to 16 can optionally include that the paging cycle is started after reading the paging message or that the paging cycle is started according to an indication given by a base station.

In example 18, the subject-matter of any of examples 14 to 17 can optionally include setting a guard time period, the guard time period being shorter than the paging cycle time period; and extending a duration of a DRX active state following the guard time period if the paging message has not yet been read in the current paging cycle.

In example 19, the subject-matter of any of examples 14 to 18 can optionally include monitoring a system information block during DRX active state.

Example 20 is a method performed by a user equipment for discontinuous reception (DRX) operation in a wireless communication network, wherein the user equipment is in an RRC-connected state, the method comprising: attempting in a DRX active state to read a paging message; monitoring whether the paging message was read since a beginning of a paging cycle; and if the paging message was not read extending the duration of a DRX active state after a predetermined guard time period has elapsed since the beginning of the paging cycle, the predetermined time period being shorter than the duration of the predetermined paging cycle.

In example 21, the subject-matter of example 20 can optionally include that attempting to read a paging message is effectuated regardless whether the paging message is included in a paging message dedicated to the user equipment or in a cell specific paging message.

In example 22, the subject-matter of any of examples 20 and 21 can optionally include that monitoring comprises setting and reading a paging monitored flag.

In example 23, the subject-matter of any of examples 20 to 22 can optionally include that a new paging cycle is started after the paging message was read.

In example 24, the subject-matter of example 23 can optionally include that reading the paging message in a DRX active state is attempted based on at least one of the following considerations: —how many occasions for reading the paging message are still available before an end of this paging cycle; —how many occasions for reading the paging message are within a DRX active state; —how often are occasions within a DRX active state.

Example 25 is one or more non-transitory computer readable media comprising program instructions causing a processor to start at a predefined time into a DRX active state; check whether a paging message has already been read in a current paging cycle; and if no paging message has been read in the current paging cycle check whether a paging message is to be received in the DRX active state; and read the paging message during the DRX active state.

Example 26 is a method performed by a user equipment for discontinuous reception (DRX) operation in a wireless communication network, wherein the user equipment is in an RRC-connected state, the method comprising: setting a paging monitored flag to FALSE at a beginning of a predefined paging cycle; only if the paging monitored flag is set to FALSE checking during a DRX active state if a paging message can be read; setting the paging monitored flag to TRUE after a paging message was read.

In example 27, the subject-matter of example 26 can optionally include setting a guard time, the guard time being before the end of the predefined paging cycle; and checking at the guard time the paging monitored flag.

In example 28, the subject-matter of example 27 can optionally include extending a duration of a DRX active state occurring after the guard time if the paging monitored flag is still set to FALSE, the duration of the DRX active state being extended until the paging monitored flag is set to TRUE.

In example 29, the subject-matter of any of examples 26 to 28 can optionally include monitoring a system information block during DRX active state; checking in the system information block whether a paging message was transmitted indicating a system modification or an alert information.

Example 30 is a user equipment for discontinuous reception (DRX) operation in a wireless communication network, wherein the user equipment comprises: a receiver configured to operate in an RRC-connected state with predefined DRX active state time periods; and a paging monitor configured to set a paging monitored flag to FALSE at a beginning of a predefined paging cycle; check only if the paging monitored flag is set to FALSE during a DRX active state time period if a paging message can be read; set the paging monitored flag to TRUE after a paging message was read.

In example 31, the subject-matter of example 30 can optionally include that the paging monitor is further configured to: set a guard time, the guard time being before the end of the predefined paging cycle; and check at the guard time the paging monitored flag.

In example 32, the subject-matter of example 31 can optionally include that the paging monitor is further configured to: extend a duration of a DRX active state of the receiver occurring after the guard time if the paging monitored flag is still set to FALSE, and to keep the receiver in the DRX active state until the paging monitored flag is set to TRUE.

In example 33, the subject-matter of any of examples 30 to 32 can optionally include a system information block monitor configured to monitor a system information block during a DRX active state; and configured to check in the system information block whether a general paging message was transmitted indicating a system modification or an alert information.

While the disclosure has been illustrated and described with respect to one or more implementations, alterations and/or modifications may be made to the illustrated examples without departing from the spirit and scope of the appended claims. In particular, with regard to the various functions performed by the above described components or structures, the terms used to describe such components are intended to correspond, unless otherwise indicated, to any component or structure which performs the specified function of the described component (e.g. that is functionally equivalent), even though not structurally equivalent to the disclosed structure which performs the function in the herein illustrated exemplary implementations of the disclosure.

The invention claimed is:

1. A user device for discontinuous reception (DRX) operation in a wireless communication network, the user device comprises:
   a receiver configured to operate in a Radio Resource Control (RRC)-connected state with predefined DRX active state time periods; and
   one or more processors configured to:
      determine whether a paging message was read in a current paging cycle and, when no paging message has been read in the current paging cycle, to
      determine whether a paging message is to be received in the current DRX active state time period, and
      read the paging message during the current DRX active state time period; and
      set a guard time period that is measured from a start of the paging cycle and is shorter than the paging cycle, and to extend a duration of a DRX active state time period following the guard time period when the paging message has not been read during the current paging cycle upon expiration of the guard time period.

2. The user device of claim 1, wherein the one or more processors are further configured to process a paging monitored flag.

3. The user device of claim 1, wherein the one or more processors are further configured to set a paging monitored flag to FALSE at a beginning of a predefined paging cycle.

4. The user device of claim 3, wherein the one or more processors are further configured to set the paging monitored flag to TRUE after the paging message was read.

5. The user device of claim 1, wherein the one or more processors are further configured to start a new paging cycle after the paging message was read.

6. The user device of claim 1, wherein the one or more processors are further
   configured to monitor a system information block during a DRX active state time period to detect information included in the paging message.

7. The user device of claim 1, wherein the one or more processors are configured to adjust the paging cycle to start at a DRX active state time period during which a last paging message was read within the paging cycle.

8. The user device of claim 1, wherein the one or more processors are configured to set the guard time to be shorter than the paging cycle by one paging frame.

9. A user device for discontinuous reception (DRX) operation in a wireless communication network, the user device comprising:
   a receiver configured to operate in a Radio Resource Control (RRC)-connected state with predefined DRX active state time periods; and
   one or more processors configured to:
      set a guard time period that is measured from a start of a paging cycle and is shorter than the paging cycle;
      attempt, during a DRX active state time period, to read a paging message;
      monitor whether the paging message was read since a beginning of the paging cycle and, when the paging message was not read during the current paging cycle upon expiration of the guard time period, to
      adjust the duration of a DRX active state time period.

10. The user device of claim 9, wherein the one or more processors are further configured to read a paging message when the paging message is included in a paging message dedicated to the user device or when the paging message is included in a cell-specific paging message.

11. The user device of claim 9, wherein the one or more processors are further configured to set and to read a paging monitored flag.

12. The user device of claim 9, wherein the one or more processors are further configured to start a new paging cycle after the paging message was read.

13. The user device of claim 12, wherein the one or more processors are further configured to determine whether a paging message in a DRX active state time period is to be read based on at least one of the following conditions:
   a number of occasions for reading the paging message that are still available before an end of a current paging cycle;
   a number of occasions for reading the paging message that are within a DRX active state time period; and
   a frequency of occasions that are within a DRX active state time period.

14. A method for performing discontinuous reception (DRX) operation in a wireless communication network, the method comprising:
   starting at a predefined time into a DRX active state time period;
   setting a guard time period that is measured from a start of a paging cycle and is shorter than the paging cycle;

determining whether a paging message was read in a current paging cycle and, when no paging message has been read in the current paging cycle determining whether a paging message is to be received in the DRX active state time period, and reading the paging message during the DRX active state time period; and extending a duration of a DRX active state time period following the guard time period when the paging message has not been read during the current paging cycle upon expiration of the guard time period.

15. The method of claim 14, wherein the method is performed by a user device while in a Radio Resource Control (RRC)-connected state.

16. The method of claim 14, wherein determining whether the paging message has already been read in the current paging cycle is performed by reading a paging monitored flag.

17. The method of claim 16, further comprising:
setting a paging monitored flag to FALSE at a beginning of the predefined paging cycle.

18. The method of claim 17, further comprising:
setting the paging monitored flag to TRUE after reading the paging message.

19. The method of claim 16, wherein the paging cycle is started after reading the paging message.

20. The method of claim 16, further comprising:
monitoring a system information block during the DRX active state time period.

21. The method of claim 16, wherein the paging message is read when the paging message is included in a paging message dedicated to a user device or when the paging message is in a cell-specific paging message.

22. The method of claim 16, wherein reading the paging message in the DRX active state time period is performed based on at least one of the following conditions:
a number of occasions for reading the paging message that are still available before an end of the current paging cycle;
a number of occasions for reading the paging message that are within a DRX active state time period;
a frequency of occasions that are within a DRX active state time period.

23. The method of claim 16, wherein the paging cycle is started according to an indication given by a base station.

24. One or more non-transitory computer readable media comprising program instructions causing a processor to:
start at a predefined time in a discontinuous reception (DRX) active state time period;
set a guard time period that is measured from a start of a paging cycle and is shorter than the paging cycle;
determine whether a paging message has already been read in a current paging cycle and, when no paging message has been read in the current paging cycle, further determining
whether a paging message is to be received in the DRX active state time period, and reading
the paging message during the DRX active state time period; and
extending a duration of the DRX active state time period following the guard time period when the paging message has not been read during the current paging cycle upon expiration of the guard time period.

* * * * *